(12) United States Patent
Fukuda et al.

(10) Patent No.: US 11,574,181 B2
(45) Date of Patent: Feb. 7, 2023

(54) FUSION OF NEURAL NETWORKS

(71) Applicant: INTERNATIONAL BUSINESS MACHINES CORPORATION, Armonk, NY (US)

(72) Inventors: Takashi Fukuda, Kanagawa-ken (JP); Masayuki Suzuki, Tokyo (JP); Gakuto Kurata, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 945 days.

(21) Appl. No.: 16/406,426

(22) Filed: May 8, 2019

(65) Prior Publication Data

US 2020/0356850 A1    Nov. 12, 2020

(51) Int. Cl.
*G06N 3/08* (2006.01)
*G06N 3/04* (2006.01)

(52) U.S. Cl.
CPC ............. *G06N 3/08* (2013.01); *G06N 3/0454* (2013.01)

(58) Field of Classification Search
CPC .......... G06N 3/08; G06N 3/0454; G06N 3/04; G06N 3/049
See application file for complete search history.

(56) References Cited

U.S. PATENT DOCUMENTS

| | | |
|---|---|---|
| 9,798,751 B2 | 10/2017 | Birdwell et al. |
| 2017/0011738 A1 | 1/2017 | Senior et al. |
| 2017/0161608 A1 | 6/2017 | Saon et al. |
| 2017/0162203 A1 | 6/2017 | Huang et al. |
| 2019/0043508 A1* | 2/2019 | Sak .......................... G10L 17/00 |
| 2019/0102678 A1* | 4/2019 | Chang ..................... G06K 9/627 |
| 2020/0182995 A1* | 6/2020 | Zeng ........................ G01S 7/006 |

\* cited by examiner

*Primary Examiner* — John J Lee
(74) *Attorney, Agent, or Firm* — Tutunjian & Bitetto, P.C.; Randy Emilio Tejeda

(57) ABSTRACT

Fusion of neural networks is performed by obtaining a first neural network and a second neural network. The first and the second neural networks are the result of a parent neural network subjected to different training. A similarity score is calculated of a first component of the first neural network and a corresponding second component of the second neural network. An interpolation weight is determined for the first and the second components by using the similarity score. A neural network parameter of the first component is updated based on the interpolation weight and a corresponding neural network parameter of the second component to obtain a fused neural network.

20 Claims, 10 Drawing Sheets

| Test set | ChildNet $C_A$ (Domain-free) | ChildNet $C_B$ (Domain-specific) |
|---|---|---|
| ASpIRE | 38.7 | 39.9 |
| BN-Dev04f | 15.4 | 14.5 |
| Aurora-4 | 12.2 | 12.0 |
| Accented | 18.3 | 25.3 |
| Average | 21.2 | 22.9 |

FIG. 5

| Test set | Flat fusion | Layer-wise | Neuron-wise |
|---|---|---|---|
| ASpIRE | 38.3 | 38.5 | 38.5 |
| BN-Dev04f | 15.1 | 15.1 | 15.1 |
| Aurora-4 | 11.9 | 12.0 | 12.0 |
| Accented | 19.3 | 18.9 | 18.5 |
| Average | 21.2 | 21.1 | 21.0 |

*FIG. 6*

| Test set | Input-side | Output-side | Both-side |
|---|---|---|---|
| ASpIRE | 38.5 | 38.5 | 38.5 |
| BN-Dev04f | 15.1 | 15.0 | 15.1 |
| Aurora-4 | 12.0 | 12.0 | 12.0 |
| Accented | 18.5 | 18.8 | 18.7 |
| Average | 21.0 | 21.1 | 21.1 |

*FIG. 7*

| Test set | w/ bias | w/o bias |
|---|---|---|
| ASpIRE | 38.5 | 38.4 |
| BN-Dev04f | 15.1 | 15.1 |
| Aurora-4 | 12.0 | 12.0 |
| Accented | 18.5 | 19.0 |
| Average | 21.0 | 21.2 |

FIG. 8

| Test set | Neuron-wise $(C_A+C_B)$ | ChildNet $C_C$ (Accented-specific) | Neuron-wise $(C_A+C_B+C_C)$ |
|---|---|---|---|
| ASpIRE | 38.5 | 38.8 | 38.5 |
| BN-Dev04f | 15.1 | 15.6 | 15.1 |
| Aurora-4 | 12.0 | 12.8 | 12.1 |
| Accented | 18.5 | 17.3 | 18.0 |
| Average | 21.0 | 21.1 | 20.9 |

FIG. 9

FUSION OF NEURAL NETWORKS

BACKGROUND

The present invention relates to fusing neural networks. More specifically, the present invention relates to fusing two or more neural networks having different characteristics.

A machine learning model, such as a neural network, is trained to improve the accuracy of output of the model. In a technical field such as automatic speech recognition (ASR), several methods for combining models having different characteristics to obtain synergistic effects have been researched. For example, joint training of neural networks is a method that connects an output layer or a middle layer of one neural network to a layer of another neural network and trains the entire neural network including these neural networks. In other examples, there are methods to interpolate posterior probabilities obtained from several neural networks (posterior-level combination), or to select output by majority rule from several neural networks (output-level combination). However, these methods are computationally expensive as they require more resources than using a single neural network.

SUMMARY

According to an embodiment of the present invention, provided is a computer-implemented method including obtaining a first neural network and a second neural network, the first and the second neural networks being the result of a parent neural network subjected to different training, calculating a similarity score of a first component of the first neural network and a corresponding second component of the second neural network, determining an interpolation weight for the first and the second components by using the similarity score, and updating a neural network parameter of the first component based on the interpolation weight and a corresponding neural network parameter of the second component to obtain a fused neural network.

According to another embodiment of the present invention, provided is a computer program product including one or more computer readable storage mediums collectively storing program instructions that are executable by a processor or programmable circuitry to cause the processor or programmable circuitry to perform operations including, obtaining a first neural network and a second neural network, the first and the second neural networks being the result of a parent neural network subjected to different training, calculating a similarity score of a first component of the first neural network and a corresponding second component of the second neural network, determining an interpolation weight for the first and the second components by using the similarity score, and updating a neural network parameter of the first component based on the interpolation weight and a corresponding neural network parameter of the second component to obtain a fused neural network.

According to another embodiment of the present invention, provided is an apparatus including a processor or a programmable circuitry, and one or more computer readable mediums collectively including instructions that, when executed by the processor or the programmable circuitry, cause the processor or the programmable circuitry to obtain a first neural network and a second neural network, the first and the second neural networks being the result of a parent neural network subjected to different training, calculate a similarity score of a first component of the first neural network and a corresponding second component of the second neural network, determine an interpolation weight for the first and the second components by using the similarity score, and update a neural network parameter of the first component based on the interpolation weight and a corresponding neural network parameter of the second component to obtain a fused neural network.

The summary clause does not necessarily describe all necessary features of the embodiments of the present invention. Not all features described in the summary are essential to the present invention. The present invention can also be a sub-combination of the features described above.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein:

FIG. 5 shows a table of baseline performances for test sets according to an embodiment of the present invention.

FIG. 6 shows a table of performance comparisons between fusion methods according to an embodiment of the present invention.

FIG. 7 shows a table of performance comparisons between types of property vectors according to an embodiment of the present invention.

FIG. 8 shows a table of performance comparisons between including and excluding bias terms in neuron vectors according to an embodiment of the present invention.

FIG. 9 shows a table of performance comparisons of fusing three networks according to an embodiment of the present invention.

DETAILED DESCRIPTION

Hereinafter, example embodiments of the present invention will be described. The example embodiments shall not limit the invention according to the claims, and the combinations of the features described in the embodiments are not necessarily essential to the invention.

Figure 1:
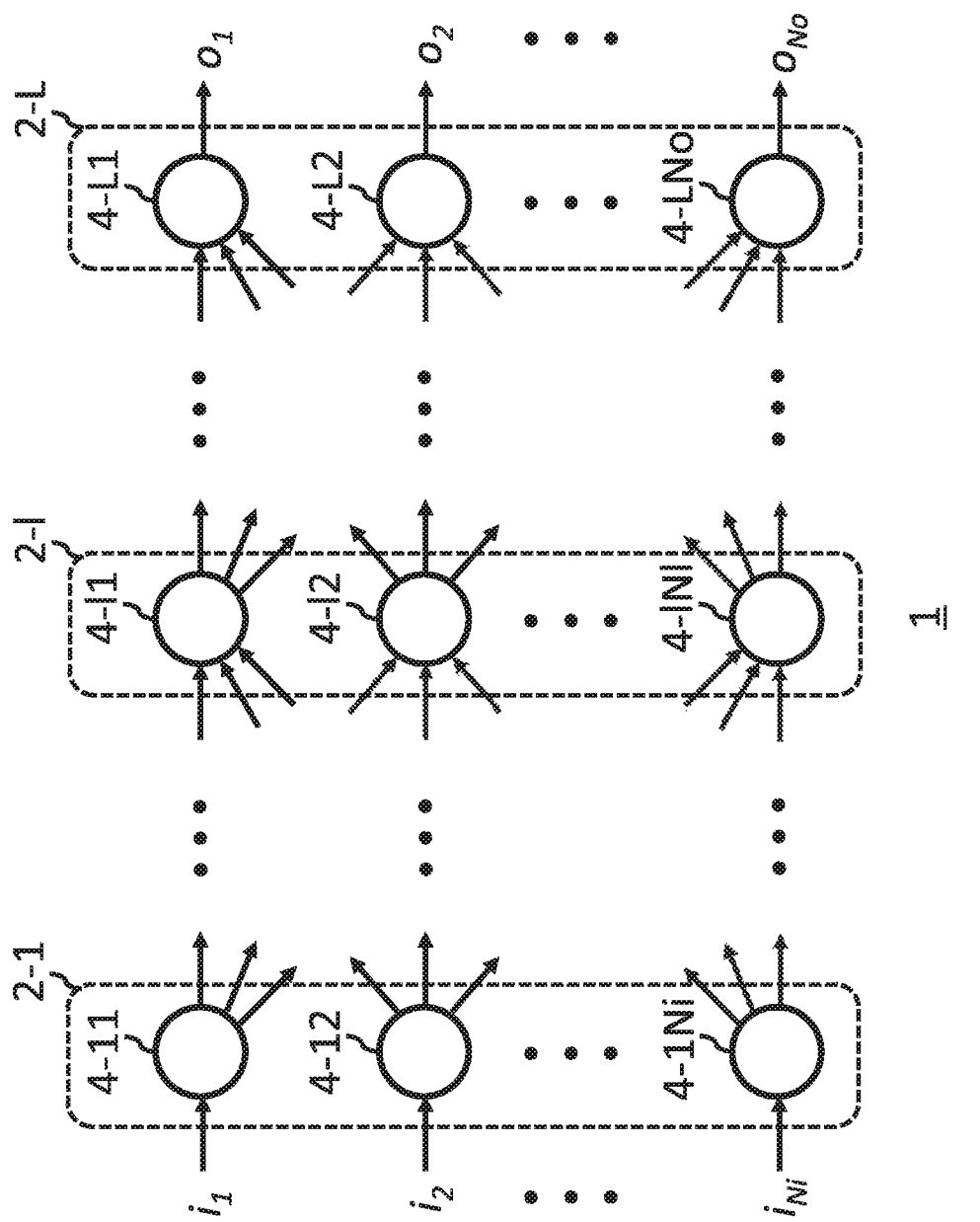
FIG. 1 shows an example of a neural network according to an embodiment of the present invention.

FIG. 1 shows an example of neural network 1 according to an embodiment of the present invention. Neural network 1 inputs one or more input values $i_1$ to $i_{Ni}$ and outputs one or more output values $o_1$ to $o_{No}$, where Ni is the number of input values and No is the number of output values. Neural network 1 includes layers 2-1 to 2-L (collectively referred to as "layer 2") where L is the number of layers in neural network 1.

Layer 2-1 is an input layer. Layer 2-1 includes input neurons 4-11 to 4-1Ni where Ni is the number of input neurons in input layer 2-1. Each input neuron 4-1$u$ (u=

1, 2, ..., Ni) receives a corresponding input value $i_u$ and outputs the input value $i_u$ to the next layer.

Neural network 1 includes one or more intermediate layers 2-1 (1=2, 3, ..., L−1). Each intermediate layer 2-1 includes neurons 4-11 to 4-1Nl where Nl is the number of neurons in layer-2-1. Each neuron 4-1v (v=1, 2, ..., Nl) is connected to at least one neuron in the previous layer through one or more synapses (or links) each of which has a weight, and receives weighted input values from connected neurons in the previous layer. Then, each neuron 4-1v calculates an output value based on the sum of the weighted input values, and outputs the output value to the next layer.

Layer 2-L is an output layer. Layer 2-L includes output neurons 4-L1 to 4-LNo, where No is the number of output neurons in the output layer 2-L. Each output neuron 4-Lw (w=1, 2, ..., No) is connected to at least one neuron in the previous layer, namely the last intermediate layer 2-(L−1), through one or more synapses, each of which has a weight, and inputs weighted input values from connected neurons in the previous layer. Then, each output neuron 4-Lw calculates an output value $o_w$ based on the sum of the weighted input values, and outputs the output value $o_w$.

Figure 2:
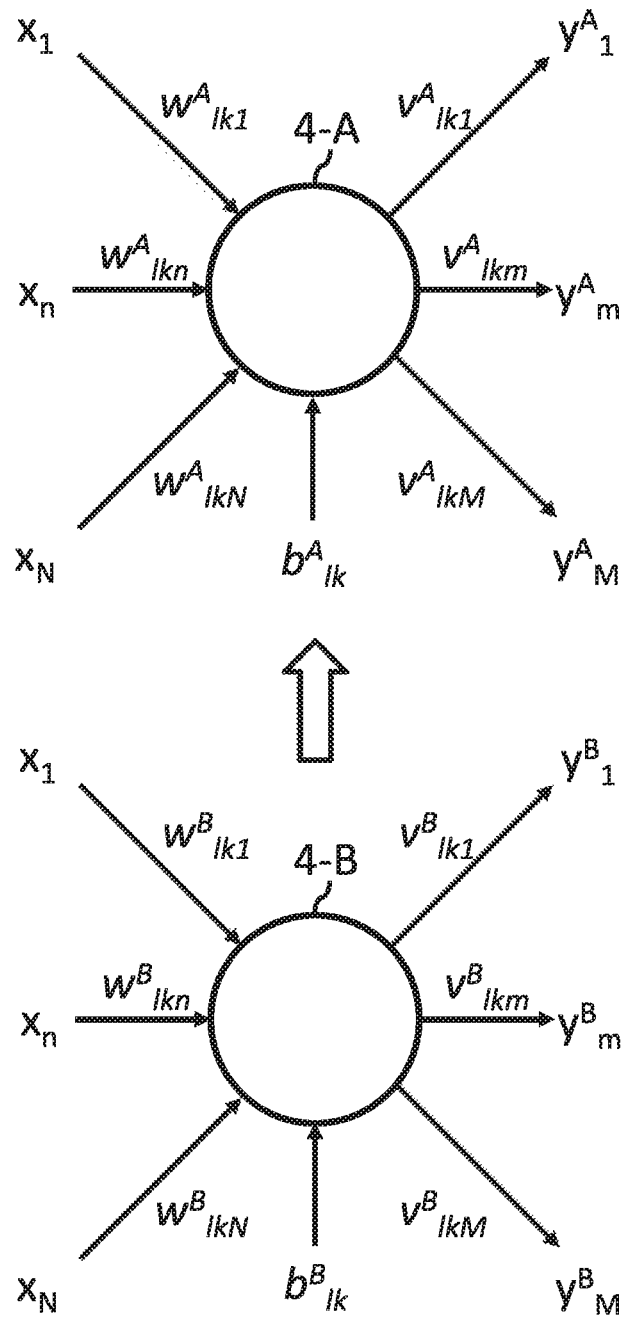
FIG. 2 shows an example of corresponding neurons of a first neural network and a second neural network according to an embodiment of the present invention.

FIG. 2 shows an example of corresponding neurons of a first neural network (neural network $N_A$) and a second neural network (neural network $N_B$) according to an embodiment of the present invention.

Neuron 4-A is neuron k in layer 1, (also referred to "neuron lk") of a first neural network $N_A$. Neuron 4-A is connected to one or more neurons n (n=1, 2, ..., N) in the previous layer through one or more synapses, and inputs each output value $x_n$ from each neuron n through a synapse having weight $w^A_{lkn}$. Weights $w^A_{lkn}$ for n=1, 2, ..., N are referred to as input weights of neuron 4-A. Neuron 4-A also has bias $b^A_{lk}$. Neuron 4-A calculates a weighted sum of output values $x_n$ by using weights $w^A_{lkn}$ for n=1, 2, ..., N and adds bias $b^A_{lk}$ to obtain an inner value (or state) of neuron 4-A. Then, neuron 4-A outputs an output value $y^A_m$ as a function (e.g., tan h or a sigmoid function) of the inner value. If neuron 4-A is an input neuron, input weights and a bias may not be associated with neuron 4-A.

Neuron 4-A is also connected to one or more neurons m (m=1, 2, ..., M) in the next layer through one or more synapses, and output value $y^A_m$ is weighted by weight $v^A_{lkm}$ assigned to each synapse connected to each neuron m in the next layer. Weights $v^A_{lkm}$ for m=1, 2, ..., M are referred to as output weights of neuron 4-A. Each output weight of each synapse is identical to an input weight of a corresponding synapse connected to each neuron in the next layer. If neuron 4-A is an output neuron, output weights may not be associated with neuron 4-A.

Neuron 4-B is neuron k in layer 1, (also referred to "neuron lk") of a second neural network $N_B$. Neuron 4-B is connected to one or more neurons n (n=1, 2, ..., N) in the previous layer through one or more synapses, and inputs each output value $x_n$ from each neuron n through a synapse having weight $w^A_{lkn}$. Weights $w^B_{lkn}$ for n=1, 2, ..., N are referred to as input weights of neuron 4-A. Neuron 4-B also has bias $b^B_{lk}$. Neuron 4-A calculates a weighted sum of output values $x_n$ by using weights $w^B_{lkn}$ for n=1, 2, ..., N and adds bias $b^B_{lk}$ to obtain an inner value (or state) of neuron 4-B. Then, neuron 4-B outputs an output value $y^B_m$ as a function (e.g., tan h or a sigmoid function) of the inner value. If neuron 4-B is an input neuron, input weights and a bias may not be associated with neuron 4-B.

Neuron 4-B is also connected to one or more neurons m (m=1, 2, ..., M) in the next layer through one or more synapses, and output value $y^B_m$ is weighted by weight $v^B_{lkm}$ assigned to each synapse connected to each neuron m in the next layer. Weights $v^B_{lkm}$ for m=1, 2, ..., M are referred to as output weights of neuron 4-B. Each output weight of each synapse is identical to an input weight of a corresponding synapse connected to each neuron in the next layer. If neuron 4-B is an output neuron, output weights may not be associated with neuron 4-B.

Suppose there is a second neural network $N_B$ which is similar to the first neural network $N_A$, although the second neural network $N_B$ has a different characteristic compared to the first neural network $N_A$. For example, the first neural network $N_A$ and the second neural network $N_B$ are trained as models for speech recognition. However, the first neural network $N_A$ can be trained by using domain-free data that covers various speakers, speaking styles, additives, and convolved noises for general-purpose ASR, whereas the second neural network $N_B$ can be trained by using domain-specific data that covers a particular acoustic condition mainly focusing on noise robustness.

In this embodiment, the first neural network $N_A$ is updated by using the second neural network $N_B$. More specifically, at least one of neural network parameters such as weights and biases of the first neural network $N_A$ are updated based on at least one of corresponding neural network parameters of the second neural network $N_B$ without modifying the structure of the first neural network $N_A$. To update neural network parameters of a first component (e.g., a neuron or a group of neurons) of the first neural network $N_A$ based on corresponding neural network parameters of the second component of the second neural network $N_B$ for the purpose of improving the performance (e.g., accuracy) of the first neural network $N_A$, it is required that the second component in the second neural network $N_B$ corresponds to the first component in the first neural network $N_A$ because of the following reason.

A neural network is initialized by, for example, assigning a random weight to each synapse and a random bias to each neuron in the neural network. Then, the neural network is trained by using a training dataset. During the training, the weights and the biases are updated to decrease the difference between outputs of the neural network and target outputs. After the training, neurons are capable of extracting different potential features from input values.

For example, if a first neuron in the first neural network $N_A$ and a second neuron in the second neural network $N_B$ extract the same potential feature from input values, the first neural network $N_A$ can be improved by updating neural network parameters relating to the first neuron based on neural network parameters relating to the second neuron. However, if the first neuron and the second neuron extract different potential features, then the first neural network $N_A$ may not be improved or can even be deteriorated.

In this embodiment, to easily determine the second component that corresponds to the first component, the first neural network $N_A$ and the second neural network $N_B$ are derived from the same parent neural network. The parent neural network is trained from an initial parent neural network and then the first neural network $N_A$ and the second neural network $N_B$ are obtained by training the parent neural network according to different training datasets. Therefore, each first neuron in the first neural network $N_A$ corresponds to a second neuron at the same location in the second neural network $N_B$ (e.g., the first neuron is k-th neuron of l-th layer in the first neural network $N_A$ and the second neuron is also k-th neuron of l-th layer in the second neural network $N_B$), and the first neuron and the corresponding second neuron are likely to extract the same potential feature.

In other embodiments, other methods can be adopted to find a corresponding pair of components from the first neural network $N_A$ and the second neural network $N_B$. Even when the first neural network $N_A$ and the second neural network $N_B$ are not derived from the same parent neural network, the second component can be specified by, for example, a user's designation.

Figure 3:
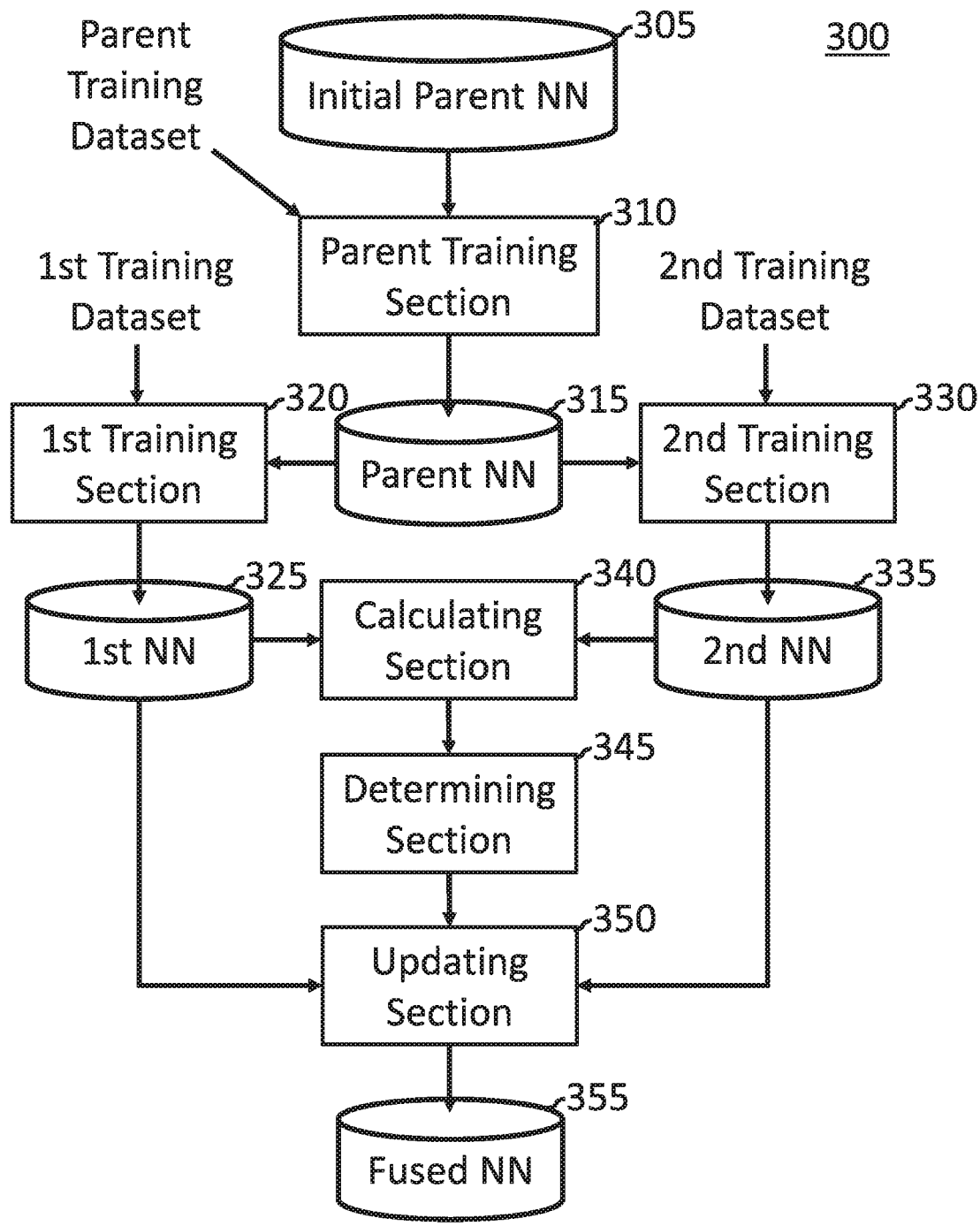
FIG. 3 shows an apparatus according to an embodiment of the present invention.

FIG. 3 shows apparatus 300 according to an embodiment of the present invention. Apparatus 300 includes storage 305, parent training section 310, storage 315, first training section 320, storage 325, second training section 330, storage 335, calculating section 340, determining section 345, updating section 350, and storage 355.

Storage 305 stores an initial parent neural network. In this embodiment, neural networks are represented as software models including preset parameters, such as the number of layers, the number of neurons in each layer, a type of each neuron and so on, and neural network parameters such as weights and biases, which are updated during training. In this case, apparatus 300 executes the software models to perform functions of the neural networks. In another embodiment, neural networks are implemented as a circuit including registers or a memory storing preset parameters and neural network parameters. Storage 305 can store one or more neural network parameters as the initial parent neural network.

Parent training section 310 is connected to storage 305. Parent training section 310 trains the initial parent neural network stored in storage 305 to derive a parent neural network according to a parent training dataset. Parent training section 310 causes the trained parent neural network, or one or more neural network parameters of the parent neural network, to be stored in storage 315.

Storage 315 is connected to parent training section 310. Storage 315 receives the parent neural network from parent training section 310 and stores the parent neural network.

First training section 320 is connected to storage 315. First training section 320 receives the parent neural network from storage 315, and trains the parent neural network according to a first training dataset to derive a first neural network $N_A$. First training section 320 causes the first neural network $N_A$, or one or more neural network parameters of the first neural network $N_A$, to be stored in storage 325.

Storage 325 is connected to first training section 320. Storage 325 receives the first neural network $N_A$ from first training section 320 and stores the first neural network $N_A$.

Second training section 330 is connected to storage 315. Second training section 330 receives the parent neural network from storage 315, and trains the parent neural network according to a second training dataset to derive a second neural network $N_B$. Second training section 330 causes the second neural network $N_B$, or one or more neural network parameters of the second neural network $N_B$, to be stored in storage 335.

Storage 335 is connected to second training section 330. Storage 335 receives the second neural network $N_B$ from storage 335 and stores the second neural network $N_B$.

Calculating section 340 is connected to storage 325 and storage 335. Calculating section 340 receives the first neural network $N_A$ and the second neural network $N_B$ from storage 325 and storage 335 respectively. Calculating section 340 calculates a similarity score of a first component of the first neural network $N_A$ and a corresponding second component of the second neural network $N_B$.

Determining section 345 is connected to calculating section 340. Determining section 345 receives the similarity score of the first and the second components and the neural network parameters of the first and the second components. Determining section 345 determines an interpolation weight for the first and the second components by using the similarity score. The interpolation weight defines how much one or more neural network parameters of the first components will be influenced by one or more corresponding neural network parameters of the second components.

Updating section 350 is connected to storage 325, storage 335, and determining section 345. Updating section 350 updates one or more neural network parameters of the first component based on the interpolation weight and one or more corresponding neural network parameters of the second component. Updating section 350 causes the updated first neural network $N_A$ to be stored in storage 355 as a fused neural network of the first and the second neural networks $N_A$ and Ns.

Storage 355 is connected to updating section 350. Storage 355 receives the fused neural network from updating section 350 and stores the fused neural network.

In this embodiment, the first component of the first neural network $N_A$ can be updated by the corresponding second component of the second neural network $N_B$ to obtain the fused neural network of the first and the second neural network $N_A$ and $N_B$. By deriving the first and the second neural network $N_A$ and $N_B$ from the same trained parent neural network, the first and the second components can be selected from the same location in the first and the second neural network $N_A$ and $N_B$ respectively.

Figure 4:
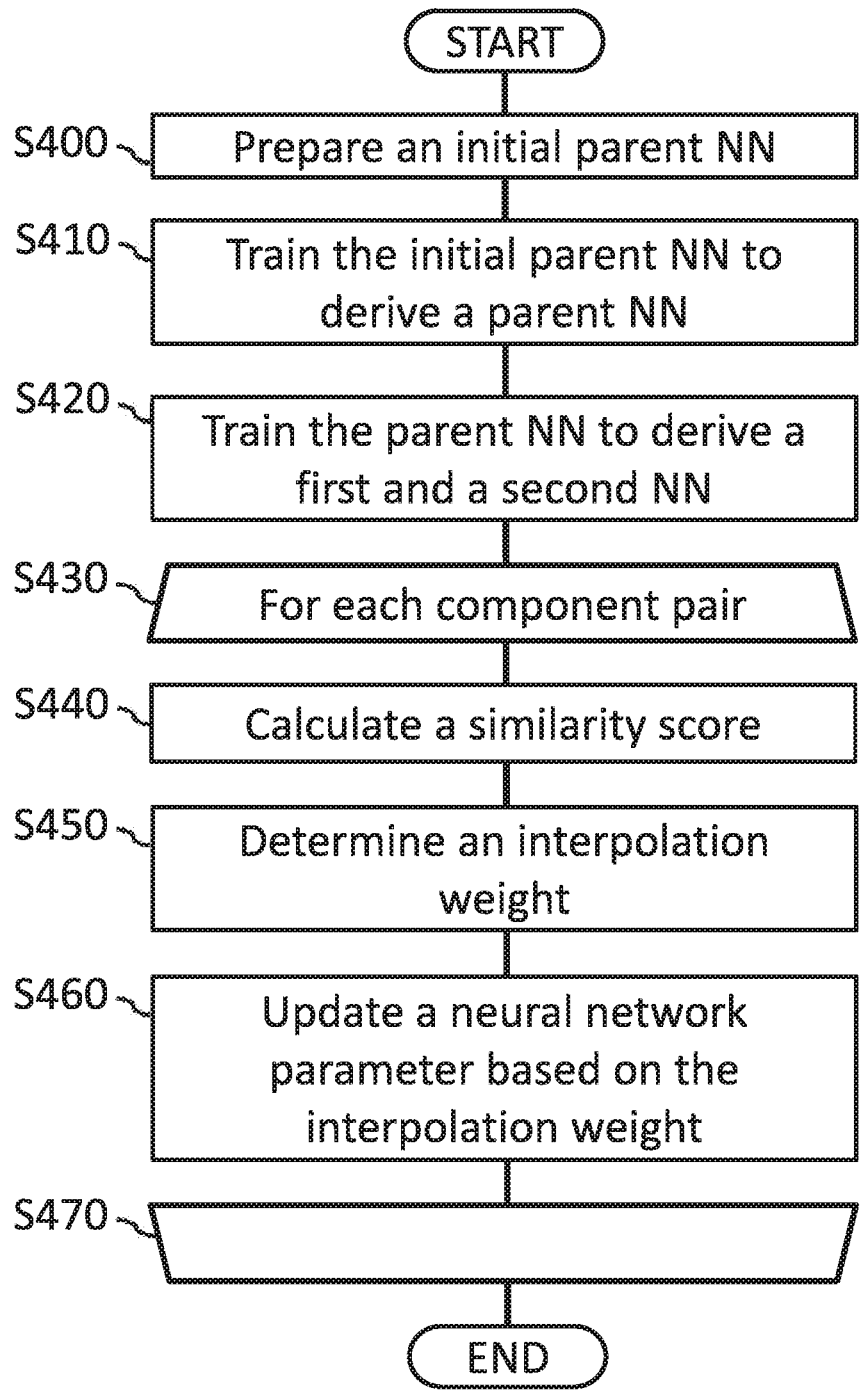
FIG. 4 shows an operational flow according to an embodiment of the present invention.

FIG. 4 shows an operational flow according to an embodiment of the present invention. The operations of FIG. 4 can be performed by, for example, apparatus 300 and its components that were explained in reference to FIG. 3. While the operational flow of FIG. 4 will be explained in reference to apparatus 300 and its components, the operational flow can be performed by other apparatus having different components as well.

At S400, apparatus 300 prepares an initial parent neural network (NN) and stores the initial parent neural network in storage 305. For example, apparatus 300 generates the initial parent neural network by assigning a random weight to each synapse and a random bias to each neuron. In another example, apparatus 300 obtains, as the initial parent neural network, a neural network that has already been trained to a certain degree from another apparatus.

At S410, parent training section 310 trains the initial parent neural network stored in storage 305 to derive a parent neural network according to a parent training dataset, and stores the trained parent neural network in storage 315. The training dataset can include one or more training sets of inputs $i_1$ to $i_{Ni}$ and target outputs (e.g., correct outputs) $o_1$ to $o_{No}$ for training the initial parent neural network.

At S420, first training section 320 and second training section 330 train the parent neural network differently to obtain a first neural network $N_A$ and a second neural network $N_B$ respectively, and store the first neural network $N_A$ and the second neural network $N_B$ in storage 325 and storage 335, respectively. In this embodiment, first training section 320 and second training section 330 train the parent neural network according to a first training dataset and a second training dataset respectively to derive the first neural network $N_A$ and the second neural network $N_B$, respectively. The first and the second datasets can be different datasets. After the training, the first neural network $N_A$ and the second neural network $N_B$ have a structure identical to the parent neural network, whereas the first neural network $N_A$ and the second neural network $N_B$ have weight values and bias values which can be different from corresponding weight values and bias values of the parent neural network.

In another embodiment, first training section 320 and second training section 330 train the parent neural network by using different training algorithms or at least one training parameter (a learning rate, the number of repetition of training) to derive the first neural network $N_A$ and the second neural network $N_B$, respectively.

In another embodiment, the parent neural network is copied to the first neural network $N_A$ without any additional training, while second training section 330 trains the parent neural network to derive the second neural network $N_B$. In the same way, the parent neural network can be copied to the second neural network $N_B$ without any additional training, while first training section 320 can train the parent neural network to derive the first neural network $N_A$.

Apparatus 300 performs S440 to S460 for each corresponding component pair of the first neural network $N_A$ and the second neural network $N_B$ (S430 and S470). Apparatus 300 can adopt various granularity of the component. For example, the first component can be a neuron or a layer of the first neural network $N_A$ and the second component can be a corresponding neuron or layer of the second neural network $N_B$. In this embodiment, apparatus 300 manages a neuron as a component (neuron-wise fusion of the first and the second networks $N_A$ and $N_B$), and apparatus 300 performs S440 to S460 for a plurality of or every corresponding neuron pairs (e.g., intermediate neurons and output neurons) of the first neural network $N_A$ and the second neural network $N_B$. In another embodiment, apparatus 300 manages a layer as a component (layer-wise fusion of the first and the second networks $N_A$ and $N_B$). In yet another embodiment, apparatus 300 manages the whole neural network as a component.

At S440, calculating section 340 calculates a similarity score of the first component of the first neural network $N_A$ in storage 325 and the corresponding second component of the second neural network $N_B$ in storage 335. In this embodiment, the similarity score is calculated by calculating similarity between sets of corresponding neural network parameters of the first and the second components. The set of neural network parameters of a component is referred to as a property vector. The property vector represents a component and is defined as including neural network parameters, such as weights and biases, relating to the component as vector elements. For example, a property vector $W^A_{lk}$ representing a property of k-th neuron in layer 1 (neuron lk) of the first neural network $N_A$ can be represented as $W^A_{lk} = [w^A_{lk1}, w^A_{lk2}, \ldots, w^A_{lkN}, b^A_{lk}]^T$ if input weights and a bias of neuron lk are included in the vector $W^A_{lk}$.

In this embodiment, calculating section 340 calculates the similarity score by calculating a cosine similarity between the sets of corresponding neural network parameters of the first and the second component. Calculating section 340 calculates a cosine similarity of the property vector $W^A_{lk}$ of the first component and the property vector $W^B_{lk}$ of the corresponding second component as the similarity score. Calculating section 340 calculates the cosine similarity $D_{lk}$ of the property vectors $W^A_{lk}$ and $W^B_{lk}$ as shown in the following expression (1).

$$D_{lk} = \frac{W^A_{lk} \cdot W^B_{lk}}{|W^A_{lk}||W^B_{lk}|} \quad (1)$$

In another embodiment, calculating section 340 can calculate the similarity score by calculating a different type of similarity. For example, calculating section 340 can calculate the similarity score based on a distance between the property vectors $W^A_{lk}$ and $W^B_{lk}$ or an inverse of the distance.

At S450, determining section 345 determines an interpolation weight for the first and the second components by using the similarity score. Determining section 345 can determine a higher interpolation weight if the similarity score represents greater similarity of the first component to the second components. In this embodiment, determining section 345 calculates the interpolation weight based on the following expression (2).

$$\gamma_{lk} = \begin{cases} \frac{\alpha(D_{lk} - \beta)}{1.0 - \beta} & (D_{lk} > \beta) \\ 0 & \text{otherwise} \end{cases} \quad (2)$$

The parameter $\alpha$ controls the range of $\gamma_{lk}$ as $0 < \gamma_{lk} \le \alpha$. The parameter $\beta$ indicates the minimum value or cutoff value of $D_{lk}$ to fuse the first component and the second component.

At S460, updating section 350 updates one or more neural network parameters of the first component based on the interpolation weight and one or more corresponding neural network parameters of the second component. Updating section 350 can perform this update such that the neural network parameter of the first component becomes closer to the corresponding neural network parameter of the second component in response to the similarity of the first component and the second component being higher, and vice versa. In this embodiment, updating section 350 updates every neural network parameter included in the property vector $W^A_{lk}$ of the first component to obtain the fused network parameter $W_{lk}$ based on the following expression (3).

$$W_{lk} = (1 - \gamma_{lk})W^A_{lk} + \gamma_{lk}W^B_{lk} \quad (3)$$

If determining section 345 calculates the interpolation weight based on expression (2), then updating section 350 updates the neural network parameters $W^A_{lk}$ of the first component to $W_{lk}$ in response to the similarity score being higher than the threshold p.

As a result of performing S430 to S470, updating section 350 stores the fused neural network (or updated first neural network) including neural network parameters $W_{lk}$ instead of the neural network parameters $W^A_{lk}$ for each first component in the first neural network $N_A$.

In this embodiment, the first and the second neural network can be fused based on the similarity score of each corresponding component pair of the first and the second neural network. The fused first neural network has the same structure of the first neural network. Therefore, the computational resource required to further train or use the fused first neural network is the same or very close to the computational resource required to use the first neural network.

In this embodiment, the first component of the first neural network and the second component of the second neural network are fused based on the interpolation weight determined by using the similarity score between the first and the second components. If the first and the second components extract the same or similar features of input values, they are fused with a high interpolation weight. If the first and the second components are trained to extract different features of input values as a result of different training, they are fused with a low interpolation weight or may not be fused. Therefore, components having different functions are not considerably deteriorated.

In another embodiment, instead of generating the parent neural network and deriving the first and the second neural networks, apparatus 300 can obtain the first neural network and the second neural network from other apparatus. In such embodiment, the first and the second neural networks can be the result of a parent neural network subjected to different training at outside of apparatus 300. In this case, apparatus 300 may not include storage 305, parent training section 310, storage 315, first training section 320, and second training section 330.

FIG. 5 shows a table of baseline performances for test sets according to an embodiment of the present invention. In this experiment, an initial parent neural network was a convolutional neural network for automatic speech recognition (ASR). The initial parent neural network was trained by using a parent training dataset including 3600 hours of audio data. Then, a first neural network (ChildNet $C_A$) and a second neural network (ChildNet $C_B$) were created from the parent neural network.

The first neural network $C_A$ was trained by using a first training dataset, which was created by adding in-house far-field speech and accented speech data to the parent training dataset. The first training dataset was named a domain-free dataset because of its diversity of speakers, speaking styles, and acoustic conditions. The second neural network $C_B$ was trained by using a second training dataset, which was created by further adding 2000 hours of domain-specific data that is completely independent from the parent training dataset and the first training dataset.

FIG. 5 shows the performances (WER: word error rates) of the first neural network $C_A$ and the second neural network $C_B$ for each of four test sets, ASpIRE, BN-Dev04f, Aurora-4, and Accented. The first neural network $C_A$ was trained with an acoustically well-balanced dataset, and the first neural network $C_A$ works robustly on average for every test set, yielding 21.2% in an averaged WER. In contrast, the second neural network $C_B$ was constructed as a noise-robust neural network, and it worked very well for BN-Dev04f and Aurora-4 tasks but had a larger WER on accented data ("Accented").

FIG. 6 shows a table of performance comparisons between fusion methods according to an embodiment of the present invention. For "Flat fusion," the first neural network $C_A$ and the second neural network $C_B$ were fused by using the same interpolation weight for all neurons. This interpolation weight, which was 0.35, maximized the accuracy of the fused neural network. For "Layer-wise fusion," an interpolation weight was calculated for each layer independently. The property vector of a layer was a concatenation of the property vectors of neurons in the layer. "For neuron-wise fusion," an interpolation weight was calculated for each neuron independently. For both of the layer-wise fusion and the neuron-wise fusion, the parameters α and β were set to 0.3 and 0.7, respectively.

From FIGS. 5 and 6, all of the fused neural networks were improved from the first neural network $C_A$ in ASpIRE, BN-Dev04f, and Aurora-4. Since the performance of the second neural network $C_B$ was poor for accented speakers, the fused neural network adopting "Flat fusion" greatly degraded the performance compared with the general-purpose first neural network $C_A$. In contrast, since layer-wise and neuron-wise fusions could control the interpolation weights on the basis of the cosine similarity between components (e.g., layers or neurons), a side-effect of the fusion was well reduced over the flat fusion, and they further improved the averaged WER compared with the domain-free network (e.g., the first neural network $C_A$).

FIG. 7 shows a table of performance comparisons between types of property vectors according to an embodiment of the present invention. The similarity score can be calculated by calculating similarity between sets of corresponding neural network parameters of the first and the second components. The sets of corresponding neural network parameters may or may not include corresponding input weight parameters of the first component and the second component. The sets of corresponding neural network parameters may or may not include corresponding output weight parameters of the first component and the second component. This table shows the performance of the fused neural network adopting neuron-wise fusion by using different types of the property vectors. For "Input-side," property vectors included input weights, but output weights were not included in property vectors. For "Output-side," the property vectors included the output weights, but input weights were not included in the property vectors. For "Both-side," the property vectors included both of input weights and output weights. Every fused neural network was improved based on acoustic knowledges from the second neural network $C_B$ and outperformed the first neural network $C_A$. Using the property vectors including input weights but not including output weights achieved the best results.

FIG. 8 shows a table of performance comparisons between including and excluding bias terms in the property vectors according to an embodiment of the present invention. The sets of corresponding neural network parameters to be used for calculating the similarity score may or may not include corresponding bias parameters of the first component and the second component. In this table, the performance of the fused neural network adopting neuron-wise fusion by using property vectors having input weights and a bias ("w/bias"), and the performance of the fused neural network adopting neuron-wise fusion by using property vectors having input weights but not having a bias are compared. The fused neural network using property vectors including a bias outperformed the fused neural network using property vectors not including a bias.

FIG. 9 shows a table of performance comparisons of fusing three networks according to an embodiment of the present invention. Three or more neural networks can be fused by, for example, performing the operational flow two or more times to fuse other second neural networks to the fused first neural network and so on. In this table, the fused neural network shown as "w/bias" in FIG. 8 ("Neuron-wise $(C_A+C_B)$" in this figure) and another second neural network ("ChildNet $C_C$") were further fused to obtain a fused neural network shown as "Neuron-wise $(C_A+C_B+C_C)$." From FIG. 5 and FIG. 9, the another second neural network $C_C$ was an accented-specific neural network which has better performance on test set "Accented" than the first and the second neural networks $C_A$ and $C_B$. By further fusing the neural network $C_C$, the performance of the fused neural network $C_A+C_B+C_C$ was improved for "Accented," without substantially degrading the performances for other test sets.

Various embodiments of the present invention can be described with reference to flowcharts and block diagrams whose blocks can represent (1) steps of processes in which operations are performed or (2) sections of apparatuses responsible for performing operations. Certain steps and sections can be implemented by dedicated circuitry, programmable circuitry supplied with computer-readable instructions stored on computer-readable media, and/or processors supplied with computer-readable instructions stored on computer-readable media. Dedicated circuitry can include digital and/or analog hardware circuits and can include integrated circuits (IC) and/or discrete circuits. Programmable circuitry can include reconfigurable hardware circuits including logical AND, OR, XOR, NAND, NOR, and other logical operations, flip-flops, registers, memory elements, etc., such as field-programmable gate arrays (FPGA), programmable logic arrays (PLA), etc.

The present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which includes one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 10:
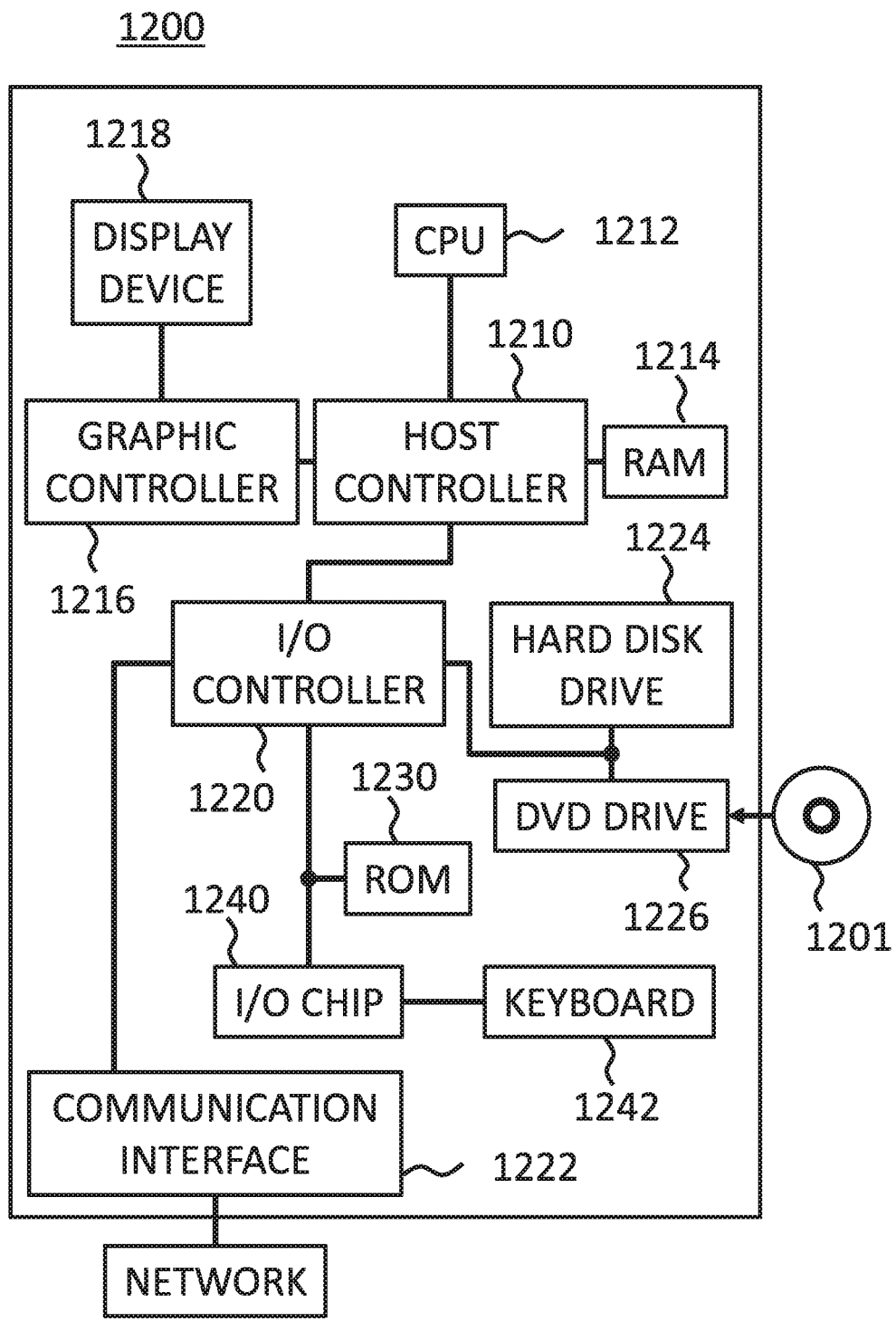
FIG. 10 shows an exemplary hardware configuration of a computer according to an embodiment of the present invention.

FIG. 10 shows an example of a computer 1200 in which aspects of the present invention can be wholly or partly embodied. A program that is installed in the computer 1200 can cause the computer 1200 to function as or perform operations associated with apparatuses of the embodiments of the present invention or one or more sections thereof, and/or cause the computer 1200 to perform processes of the embodiments of the present invention or steps thereof. Such a program can be executed by the CPU 1212 to cause the computer 1200 to perform certain operations associated with some or all of the blocks of flowcharts and block diagrams described herein.

The computer 1200 according to the present embodiment includes a CPU 1212, a RAM 1214, a graphics controller 1216, and a display device 1218, which are mutually connected by a host controller 1210. The computer 1200 also includes input/output units such as a communication interface 1222, a hard disk drive 1224, a DVD-ROM drive 1226 and an IC card drive, which are connected to the host controller 1210 via an input/output controller 1220. The computer also includes legacy input/output units such as a ROM 1230 and a keyboard 1242, which are connected to the input/output controller 1220 through an input/output chip 1240.

The CPU 1212 operates according to programs stored in the ROM 1230 and the RAM 1214, thereby controlling each unit. The graphics controller 1216 obtains image data generated by the CPU 1212 on a frame buffer or the like provided in the RAM 1214 or in itself, and causes the image data to be displayed on the display device 1218.

The communication interface 1222 communicates with other electronic devices via a network. The hard disk drive 1224 stores programs and data used by the CPU 1212 within the computer 1200. The DVD-ROM drive 1226 reads the programs or the data from the DVD-ROM 1201, and provides the hard disk drive 1224 with the programs or the data via the RAM 1214. The IC card drive reads programs and data from an IC card, and/or writes programs and data into the IC card.

The ROM 1230 stores therein a boot program or the like executed by the computer 1200 at the time of activation, and/or a program depending on the hardware of the computer 1200. The input/output chip 1240 can also connect various input/output units via a parallel port, a serial port, a keyboard port, a mouse port, and the like to the input/output controller 1220.

A program is provided by computer readable media such as the DVD-ROM 1201 or the IC card. The program is read from the computer readable media, installed into the hard disk drive 1224, RAM 1214, or ROM 1230, which are also examples of computer readable media, and executed by the CPU 1212. The information processing described in these programs is read into the computer 1200, resulting in cooperation between a program and the above-mentioned various types of hardware resources. An apparatus or method can be constituted by realizing the operation or processing of information in accordance with the usage of the computer 1200.

For example, when communication is performed between the computer 1200 and an external device, the CPU 1212 can execute a communication program loaded onto the RAM 1214 to instruct communication processing to the communication interface 1222, based on the processing described in the communication program. The communication interface 1222, under control of the CPU 1212, reads transmission data stored on a transmission buffering region provided in a recording medium such as the RAM 1214, the hard disk drive 1224, the DVD-ROM 1201, or the IC card, and transmits the read transmission data to a network or writes reception data received from a network to a reception buffering region or the like provided on the recording medium.

In addition, the CPU 1212 can cause all or a necessary portion of a file or a database to be read into the RAM 1214, the file or the database having been stored in an external recording medium such as the hard disk drive 1224, the DVD-ROM drive 1226 (DVD-ROM 1201), the IC card, etc., and perform various types of processing on the data on the RAM 1214. The CPU 1212 can then write back the processed data to the external recording medium.

Various types of information, such as various types of programs, data, tables, and databases, can be stored in the recording medium to undergo information processing. The CPU 1212 can perform various types of processing on the data read from the RAM 1214, which includes various types of operations, processing of information, condition judging, conditional branch, unconditional branch, search/replace of information, etc., as described throughout this disclosure and designated by an instruction sequence of programs, and writes the result back to the RAM 1214. In addition, the CPU 1212 can search for information in a file, a database, etc., in the recording medium. For example, when a plurality of entries, each having an attribute value of a first attribute associated with an attribute value of a second attribute, are stored in the recording medium, the CPU 1212 can search for an entry matching the condition whose attribute value of the first attribute is designated, from among the plurality of entries, and read the attribute value of the second attribute stored in the entry, thereby obtaining the attribute value of the second attribute associated with the first attribute satisfying the predetermined condition.

The above-explained program or software modules can be stored in the computer readable media on or near the computer 1200. In addition, a recording medium such as a hard disk or a RAM provided in a server system connected to a dedicated communication network or the Internet can be used as the computer readable media, thereby providing the program to the computer 1200 via the network.

While the embodiments of the present invention have been described, the technical scope of the invention is not limited to the above described embodiments. It will be apparent to persons skilled in the art that various alterations and improvements can be added to the above-described embodiments. It should also apparent from the scope of the claims that the embodiments added with such alterations or improvements are within the technical scope of the invention.

Many of the embodiments of the present invention include artificial intelligence, and include neural networks in particular. Some of the foregoing embodiments describe specific types of neural networks. However, a neural network usually starts as a configuration of random values. Such untrained neural networks must be trained before they can be reasonably expected to perform a function with success. Once trained, a neural network may not require further training. In this way, a trained neural network is a product of the process of training an untrained neural network.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A computer-implemented method comprising:
obtaining a first neural network and a second neural network, the first and the second neural networks being the result of a parent neural network subjected to different training;
calculating a similarity score of a first component of the first neural network and a corresponding second component of the second neural network;
determining an interpolation weight for the first component and the second component by using the similarity score; and
updating a neural network parameter of the first component based on the interpolation weight and a corresponding neural network parameter of the second component to obtain a fused neural network.

2. The computer-implemented method of claim 1, wherein the first component is a neuron or a layer of the first neural network and the second component is a corresponding neuron or layer of the second neural network.

3. The computer-implemented method of claim 1, wherein the updating includes updating the neural network parameter of the first component to be closer to the corresponding neural network parameter of the second component in response to the similarity of the first component and the second component being higher.

4. The computer-implemented method of claim 1, wherein the similarity score is calculated by calculating a similarity between sets of corresponding neural network parameters of the first and the second components.

5. The computer-implemented method of claim 4, wherein the similarity score is calculated by calculating a cosine similarity between the sets of corresponding neural network parameters of the first and the second component.

6. The computer-implemented method of claim 4, wherein the sets of corresponding neural network parameters include corresponding input weight parameters of the first component and the second component.

7. The computer-implemented method of claim 4, wherein the sets of corresponding neural network parameters include corresponding bias parameters of the first component and the second component.

8. The computer-implemented method of claim 1, wherein the updating includes updating the neural network parameter of the first component in response to the similarity score being higher than a threshold.

9. The computer implemented method of claim 1, wherein the obtaining includes:
training an initial parent neural network to generate the parent neural network;
training the parent neural network according to a first training dataset to generate the first neural network; and
training the parent neural network according to a second training dataset to generate the second neural network.

10. The computer implemented method of claim 9, wherein the first and the second datasets are different datasets.

11. A computer program product including one or more non-transitory computer readable storage mediums collectively storing program instructions that are executable by a processor or programmable circuitry to cause the processor or programmable circuitry to perform operations comprising:
obtaining a first neural network and a second neural network, the first and the second neural networks being the result of a parent neural network subjected to different training;
calculating a similarity score of a first component of the first neural network and a corresponding second component of the second neural network;
determining an interpolation weight for the first component and the second component by using the similarity score; and
updating a neural network parameter of the first component based on the interpolation weight and a corresponding neural network parameter of the second component to obtain a fused neural network.

12. The computer program product of claim 11, wherein the first component is a neuron or a layer of the first neural network and the second component is a corresponding neuron or layer of the second neural network.

13. The computer program product of claim 11, wherein the updating includes updating the neural network parameter of the first component to be closer to the corresponding neural network parameter of the second component in response to the similarity of the first component and the second component being higher.

14. The computer program product of claim 11, wherein the similarity score is calculated by calculating a similarity between sets of corresponding neural network parameters of the first and the second component.

15. The computer program product of claim 11, wherein the obtaining includes:
training an initial parent neural network to generate the parent neural network;
training the parent neural network according to first training dataset to generate the first neural network; and
training the parent neural network according to second training dataset to generate the second neural network.

16. An apparatus comprising:
a processor or a programmable circuitry; and
one or more non-transitory computer readable media collectively including instructions that, when executed by the processor or the programmable circuitry, cause the processor or the programmable circuitry to:
obtain a first neural network and a second neural network, the first and the second neural networks being the result of a parent neural network subjected to different training;
calculate a similarity score of a first component of the first neural network and a corresponding second component of the second neural network;
determine an interpolation weight for the first component and the second component by using the similarity score; and
update a neural network parameter of the first component based on the interpolation weight and a corresponding neural network parameter of the second component to obtain a fused neural network.

17. The apparatus of claim 16, wherein the first component is a neuron or a layer of the first neural network and the second component is a corresponding neuron or layer of the second neural network.

18. The apparatus of claim 16, wherein the updating includes updating the neural network parameter of the first component to be closer to the corresponding neural network parameter of the second component in response to the similarity of the first component and the second component being higher.

19. The apparatus of claim 16, in the similarity score is calculated by calculating a similarity between sets of corresponding neural network parameters of the first and the second component.

20. The apparatus of claim 16, wherein the obtaining includes:
 training an initial parent neural network to generate the parent neural network;
 training the parent neural network according to first training dataset to generate the first neural network; and
 training the parent neural network according to second training dataset to generate the second neural network.

\* \* \* \* \*